United States Patent
Knight, Jr. et al.

(10) Patent No.: US 10,865,370 B1
(45) Date of Patent: *Dec. 15, 2020

(54) COOK WATER PREHEAT USING EVAPORATOR VAPOR HEAT RECOVERY

(71) Applicant: Bioleap, Inc., Tampa, FL (US)

(72) Inventors: James Knight, Jr., Tampa, FL (US); Olan Wayne Mitchell, Cape Coral, FL (US)

(73) Assignee: Bioleap, Inc., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/498,701

(22) PCT Filed: Mar. 14, 2019

(86) PCT No.: PCT/US2019/022190
§ 371 (c)(1),
(2) Date: Sep. 27, 2019

(87) PCT Pub. No.: WO2019/190759
PCT Pub. Date: Oct. 3, 2019

Related U.S. Application Data

(60) Provisional application No. 62/649,196, filed on Mar. 28, 2018.

(51) Int. Cl.
*B01D 3/00* (2006.01)
*C12H 6/02* (2019.01)
(Continued)

(52) U.S. Cl.
CPC .............. *C12H 6/02* (2019.02); *B01D 3/002* (2013.01); *B01D 5/0027* (2013.01); *C12G 3/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,309,254 A | * | 1/1982 | Dahlstrom | B01D 1/26 203/47 |
| 8,906,204 B2 | * | 12/2014 | Xu | B01D 1/26 203/18 |

(Continued)

FOREIGN PATENT DOCUMENTS

| | | |
|---|---|---|
| IN | 1772/MUM/2010 A | 6/2011 |
| WO | WO2015085012 A1 | 6/2015 |

OTHER PUBLICATIONS

International search report and written opinion dated Jun. 10, 2019, for corresponding PCT/US2019/022190.

*Primary Examiner* — Johnathan Miller
(74) *Attorney, Agent, or Firm* — Wolter Van Dyke Davis, PLLC; David G. Maire

(57) ABSTRACT

Energy efficiency is improved in a grain alcohol production plant (60) by capturing heat energy that otherwise would be lost to the environment when stillage evaporator last effect vapors (22) are condensed to recycle their water content. The low temperature/pressure heat energy of these vapors is efficiently recovered and reused by placing the vapors in direct physical contact (301, 402) with a working fluid (38) to form heated working fluid (54, 66), then using the heated working fluid directly in a process of the plant. In an embodiment, cook water used for the plant fermentation process is preheated by direct contact with stillage evaporator overhead vapor via one or more direct contact heat exchangers (301, 401) and/or a thermocompressor (402).

12 Claims, 3 Drawing Sheets

(51) Int. Cl.
*C12G 3/02* (2019.01)
*B01D 5/00* (2006.01)

(56) References Cited

U.S. PATENT DOCUMENTS

| | | | | |
|---|---|---|---|---|
| 9,962,623 | B2* | 5/2018 | Zaher | B01D 3/001 |
| 10,118,107 | B1* | 11/2018 | Kwik | C10L 1/02 |
| 10,267,511 | B2* | 4/2019 | Knight, Jr. | B01D 47/00 |
| 10,392,590 | B1* | 8/2019 | Jakel | B01D 3/10 |
| 2011/0124068 | A1* | 5/2011 | Evanko | C12P 7/16 |
| | | | | 435/157 |
| 2011/0315541 | A1 | 12/2011 | Xu | |
| 2013/0122561 | A1* | 5/2013 | Evanko | B01D 3/002 |
| | | | | 435/160 |
| 2013/0309738 | A1 | 11/2013 | Barr et al. | |
| 2014/0311889 | A1* | 10/2014 | Zaher | B01D 3/065 |
| | | | | 203/42 |
| 2014/0356920 | A1* | 12/2014 | Evanko | B01D 5/006 |
| | | | | 435/160 |
| 2018/0031227 | A1* | 2/2018 | Knight, Jr. | B01D 53/265 |
| 2019/0336882 | A1* | 11/2019 | Andrade | B01D 3/145 |

\* cited by examiner

COOK WATER PREHEAT USING EVAPORATOR VAPOR HEAT RECOVERY

This application is the United States national stage of international application number PCT/US2019/022190 filed on 14 Mar. 2019, which in turn claims benefit of the 28 Mar. 2018 filing date of U.S. provisional application No. 62/649,196.

FIELD OF THE INVENTION

This invention relates generally to grain alcohol production, and more specifically to energy management in a grain alcohol production plant, and in particular to the recovery of heat from vapor produced in a multiple effect evaporator of a grain alcohol plant such as a dry grind corn ethanol plant.

BACKGROUND OF THE INVENTION

Distillation is a known process for purifying a mixture by selectively evaporating constituent parts of the mixture. A multiple effect evaporator performs a distillation process by using steam or other driving fluid to evaporate water or other relatively higher volatile component(s) from a mixture in a sequence of vessels, where the vapor produced in a first vessel is used as the driving fluid in a downstream vessel (such as a subsequent effect in a multiple effect evaporator) to further purify the condensate produced in the first vessel. Such evaporation or distillation processes are commonly used in grain alcohol plants both for purifying the alcohol product (typically ethanol, in distillation) produced by a fermentation process, and for forming syrup (in a multiple effect evaporator) by concentrating thin stillage produced from the still bottoms of the fermentation process for sale as a constituent of distiller's grains.

In the process of forming syrup, the bottom stills from the distillation process (whole stillage) are processed through a centrifuge to produce thin stillage and a wet cake. The water content of the thin stillage is then reduced in a multiple effect evaporator to produce a syrup, which is then rejoined with the wet cake for sale as distiller's wet grain with solubles (DWGS). To improve shelf life, the DWGS may optionally be dried and sold as distiller's dry grain with solubles (DDGS). In order to reduce the water consumption of the grain alcohol plant, the overhead water vapor produced by the stillage evaporator is condensed in a dedicated condenser, with the recovered water then returned to a front end of the plant as part of the cook water used for the fermentation process.

FIG. 1 illustrates aspects of a known grain alcohol plant 10, particularly its stillage evaporation 12 and cook water supply 14 systems. Thin stillage 16 with typically 2-7% solids is processed through a multiple effect evaporator 18 to produce a syrup product 20 having typically 30-50% solids and a last effect overhead vapor 22 (primarily water vapor). Three evaporators 201, 202, 20*n* are shown, but one will appreciate that other plants may have more or fewer evaporators. The syrup 20 is utilized in the balance of the plant 104 to produce distiller's grain with solubles 24 and possibly other products. The stillage is produced as a byproduct of the fermentation of a grain product such as corn mash 26 (approximately 33% solids) which is formed in a slurry tank 103 by combining corn flower 28 (approximately 90% solids) and hot cook water 30. A cook water supply 101 collects condensate 32 from the evaporators 18 and from a non-contact plant condenser 200 which receives the last effect vapor 22, with additional make-up water 34 being provided as needed. The condenser 200 transfers heat from the stillage evaporator last effect vapor 22 to a flow of cooling water 36 (typically cooling tower water). The cook water supply 101 provides cool cook water 38 to a cook water heater 102 which typically receives boiler steam (not shown) as a heat source. The cook water heater 102, in turn, supplies hot cook water 30 to the slurry tank 103. As described above, the heat transferred from the last effect vapor 22 into the cooling water 36 via the condenser 200 is subsequently lost to the environment in the cooling water return 40.

BRIEF SUMMARY OF THE INVENTION

The inventors have recognized that there is room for improvement in the method and apparatus used in the evaporation and water recovery processes of a grain alcohol production plant. Innovations described herein can produce significant reductions in the energy consumption of such plants. The prior technique of using a non-contact condenser to condense overhead vapors from a multiple effect evaporator results in the transfer of heat energy from the vapor to a cooling fluid, usually water. The transferred heat is ultimately lost to the environment when the cooling fluid is recycled back to the condenser. Recovery of this heat energy has heretofore been deemed uneconomical because of the relatively low pressure/temperature of the vapor. Moreover, not only is this heat lost, but energy is actually consumed to provide the cooling water to the condenser in order to dump the waste heat to the environment.

The present invention innovatively extracts some of the latent heat available in the overhead vapor prior to the condensation process, thereby increasing plant efficiency directly by reducing the heat lost to the environment and indirectly by reducing the energy consumption demands of the condenser cooling system. The present inventors have recognized that the benefit of capturing waste heat from the vapor produced in the last effect of a multiple effect evaporator involves not only the way that the heat is transferred from the last effect vapor into another fluid, but also the way that the fluid heated by the vapor is subsequently used to extract the recovered heat energy.

As described herein, this is now accomplished in an economically viable manner by utilizing a working fluid for the capture of the waste heat, wherein the working fluid is compatible with a fluid used in a balance of plant process. The working fluid is placed into direct physical contact with the last effect vapor in order to transfer heat energy from the vapor to the fluid, then the heated working fluid is used directly in another plant process. One such working fluid is cook water, which is heated by direct contact with the last effect vapor produced by the stillage evaporator. The heated cook water is then used in the plant's slurry and fermentation process where the heat transferred from the last effect vapor serves to reduce the amount of energy required to heat the cook water to a desired temperature.

Cook water is a useful working fluid for this application because it is known to combine condensate from the stillage evaporation process with makeup water or other water streams in the plant to form cook water, and thus the cook water is chemically compatible with the evaporator last effect vapor. The vapor from the stillage evaporator which is condensed when placed in direct contact with cool cook water is removed from the flow into the condenser (latent heat recovery), and the remaining uncondensed vapor is also provided to the condenser at a somewhat lowered temperature (sensible heat recovery).

Embodiments of the present invention can overcome an inherent inefficiency in the design of existing grain alcohol plants that both utilize a low pressure multiple effect evaporation system and that utilize boiler steam to heat cook water. The inefficiency arises because those known plants condense the last effect vapor from the evaporation system in a condenser cooled by cooling tower water before then reheating the recovered water with plant steam in a cook water heater. The present invention essentially short circuits a portion of that process by simply transferring heat directly from the vapor to the cook water. The significance of the present innovation can be appreciated by noting that about half of a typical grain alcohol plant's total energy requirement leaves productive use at the last effect vapor condenser. Thus, significant energy savings (on the order of hundreds of thousands of dollars per year) can be realized by implementing the apparatus and methods described herein.

BRIEF DESCRIPTION OF THE DRAWINGS

The invention is explained in the following description in view of the drawings that show.

Similar components are numbered consistently in the various figures.

DETAILED DESCRIPTION OF THE INVENTION

Figure 1:
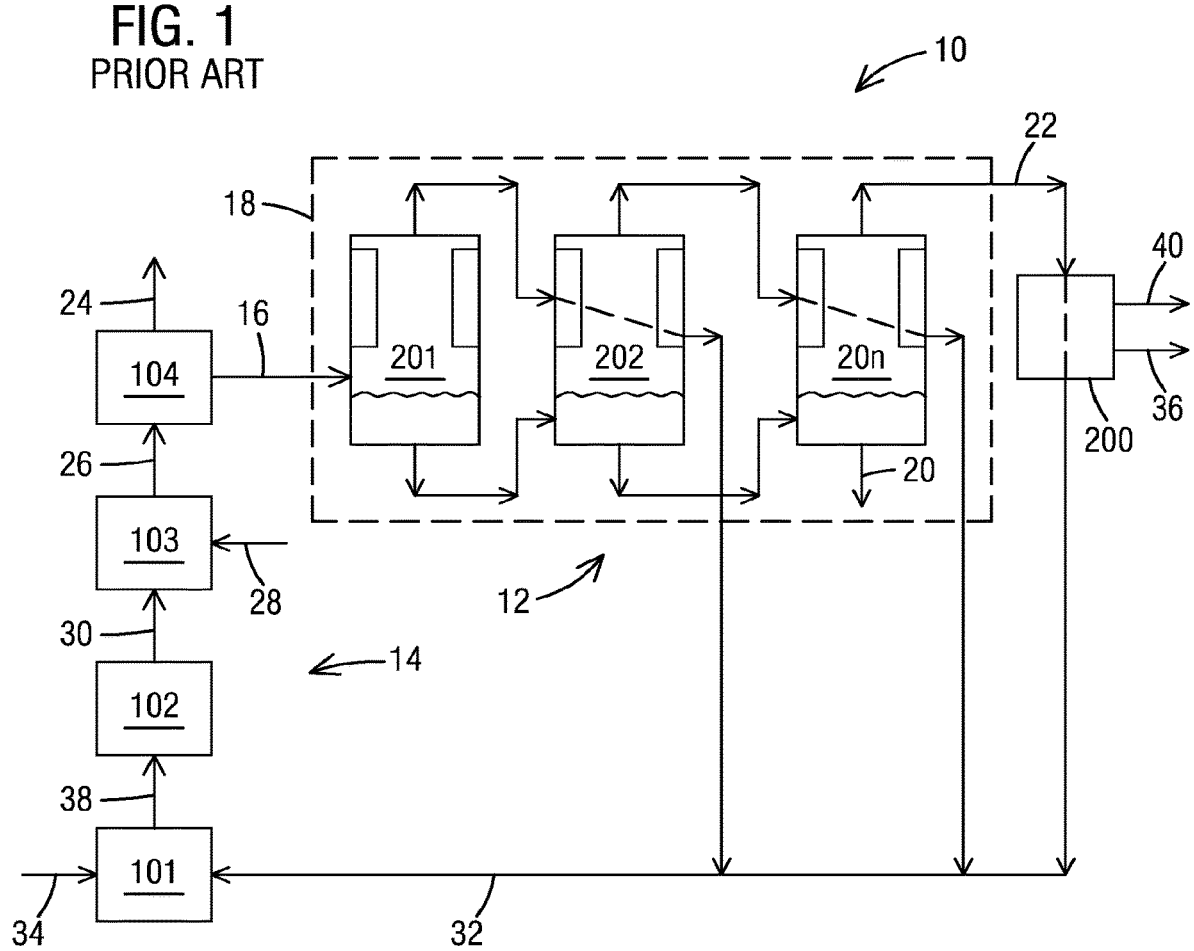
FIG. 1 is a schematic diagram of a prior art dry mill corn ethanol plant.
Figure 2:
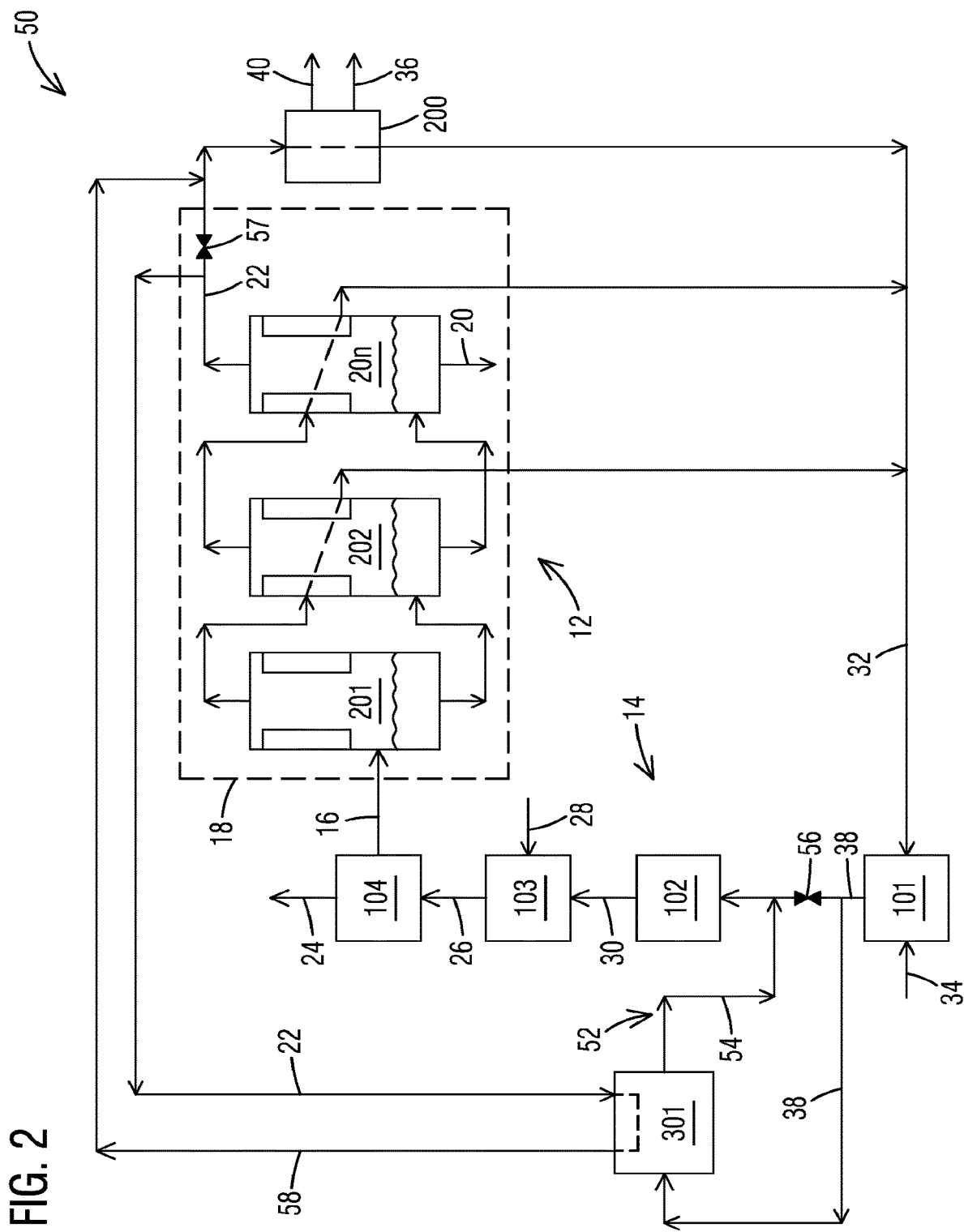
FIG. 2 is a schematic diagram of an embodiment of the invention for recovering heat from a stillage evaporator using a direct contact heat exchanger in the cook water stream.

FIG. 2 illustrates an embodiment of the invention which improves upon the prior art design of FIG. 1 by capturing some of the heat that is otherwise lost to the environment through condenser 200. The invention may be added to an existing plant or it may be incorporated into an original plant construction. In the embodiment of FIG. 2, an improved grain alcohol plant such as corn ethanol plant 50 includes a working fluid loop 52 wherein cool cook water 38 is diverted from the cook water supply 101, heated by direct contact with at least a portion of the stillage evaporator last effect vapor 22 in a direct contact heat exchanger (direct contact condenser) 301 to form a warm cook water mixture 54, which is then directed into an inlet of the cook water heater 102. The working fluid in this embodiment is the cook water, and the fluid loop directs at least a portion of the cook water from its prior art cook water system path, through a direct contact device, then back to the cook water system, thereby condensing at least a portion of the overhead vapor in the direct contact device and heating the cook water. Valves 56, 57 may be used to selectively activate the working fluid loop 52. In an exemplary plant, the temperature of the last effect vapor 22 may be about 125° F., which has been found in the prior art to be too low to permit further economical heat extraction. However, with the temperature of the cool cook water 38 of the exemplary plant being about 90° F., the present inventors have discovered that heat can be efficiently captured and made available for use in a single step by using a direct contact device for heat transfer. Both sensible and latent heat is transferred in the direct contact heat exchanger 301, as some of the last effect vapor 22 is condensed and never reaches condenser 200, while the remaining cooled overhead vapor 58 that does reach condenser 200 is somewhat cooler than would be experienced in the prior art plant of FIG. 1. The quantity of heat that is lost to the environment through condenser 200 is thus reduced, and the heat demand for the cook water heater 102 is reduced correspondingly.

Figure 3:
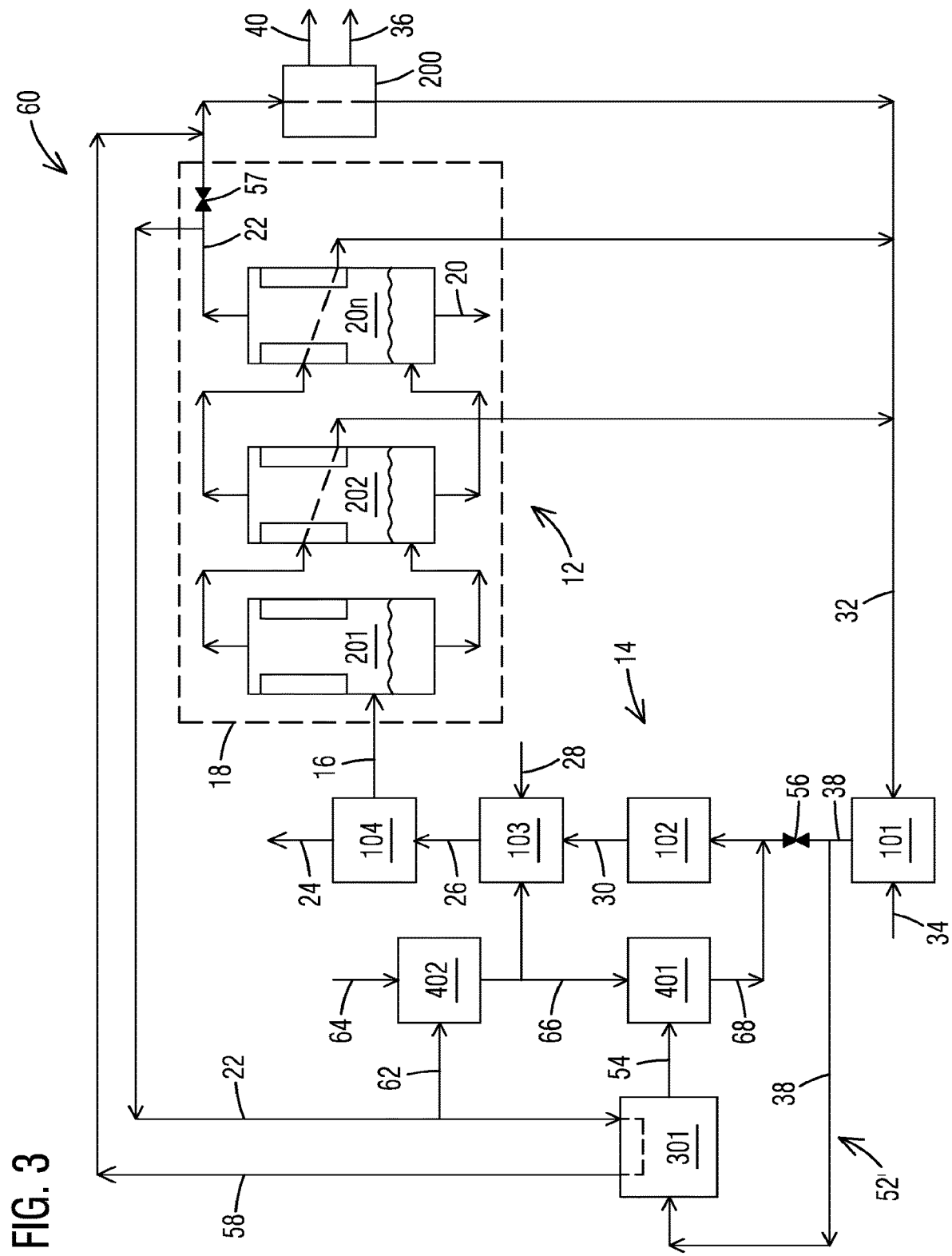
FIG. 3 is a schematic diagram of an embodiment of the invention for recovering heat from a stillage evaporator using two direct contact heat exchangers and a thermocompressor in the cook water stream.

FIG. 3 illustrates another embodiment of the invention in grain alcohol plant 60. Similar to plant 50 of FIG. 2, plant 60 includes a working fluid loop 52' wherein cool cook water 38 is diverted from the cook water supply 101, heated by direct contact with at least a portion of the stillage evaporator last effect vapor 22 in a direct contact device such as direct contact heat exchanger (direct contact condenser) 301 to form a warm cook water mixture 54. In plant 60 of FIG. 3, at least a portion 62 of the last effect vapor 22 is combined with a plant process vapor 64, such as boiler steam, in a thermocompressor 402 to produce a vapor mixture 66. The term "thermocompressor" as used herein is generally meant to include other similarly functioning direct contact devices such as injectors, ejectors, jet pumps, exhauster, etc. which merge lower and higher pressure fluids to produce an intermediate pressure fluid, such as by utilizing the venturi effect. In the exemplary plant where the last effect vapor 22 has a saturation temperature of about 125° F., and the temperature of the warm cook water mixture 54 is close to that temperature, the vapor mixture 66 exiting the thermocompressor 402 may be brought to a saturation temperature of about 137° F. The vapor mixture 66 can then be directed to the slurry tank 103 and/or directed to a second direct contact device such as direct contact heat exchanger 401 where it is mixed with the warm cook water mixture 54 to form a yet warmer cook water mixture 68. In the exemplary plant, the temperature of the warmer cook water mixture 68 provided from the second direct contact heat exchanger 401 to the cook water heater 102 may be about 137° F. Thus the incoming water temperature of the cook water heater 102 is raised from about 90 E of the prior art plant 10 to about 137° F. of the exemplary embodiment of plant 60, resulting in a corresponding reduction in the amount of energy consumed by the heater 102 to reach a target outlet temperature.

It will be appreciated that the working fluid loop of the present invention may include only one direct contact device with or without an upstream thermocompressor, or more than one direct contact device. The thermocompressor 402 may be provided with boiler steam as the motive fluid or with any other fluid of appropriate temperature and pressure that is available in the plant and that is compatible with the chemistry requirements of the fermentation process. Moreover, it will be appreciated that the working fluid loop may receive and return the cook water to the plant cook water system at any appropriate locations in the flow of cook water in order to optimize the efficiency of the heat transfer. For example, other embodiments may return the heated cook water into a jet cooker or an enzyme liquefaction or fermentation tank.

Methods according to embodiments of the invention may also be appreciated with reference to FIGS. 2 and 3. At least a portion of the last effect vapor from a grain alcohol production plant multiple effect evaporator is directed into direct contact with a working fluid, such as cook water. The heated working fluid is then used in a process of the plant, such as a fermentation process. The amount of heat added to the working fluid reduces a downstream heat demand for the working fluid, and it reduces the amount of heat that is dumped to the environment through a condenser or other ultimate heat sink mechanism. The last effect vapor may be provided directly to a direct contact heat exchanger, and/or it may be mixed as a suction vapor with a motive plant process vapor, such as boiler steam, in a thermocompressor upstream of the direct contact heat exchanger to form a vapor mixture, with the vapor mixture being mixed with a warmed working fluid mixture produced in another direct contact heat exchanger.

Cook water is a useful embodiment of a working fluid for the invention because of its chemical compatibility with the stillage evaporator last effect vapor and because of the multiple stages of heating and use of cook water in the fermentation process which provide flexibility for designing a working fluid heat exchange loop of optimal efficiency.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The terms cool, warm, warmer and warmed are used herein in a relative sense to indicate progressively higher temperatures from cool to warm to warmer, and where cool can be heated to become warm, warmer or warmed, and where warmer in one embodiment does not necessarily indicate a higher temperature than warm in a different embodiment, and where both warm and warmer are considered warmed. Some known and necessary components of grain alcohol plants, such as pumps, drains, instrumentation, etc. may be omitted from illustration and discussion herein for the purpose of clarity and conciseness in the description of the inventive aspects.

The invention claimed is:

1. A system for a grain alcohol plant including an evaporator operable to remove moisture from a thin stillage and to produce an overhead vapor, a non-contact condenser configured to receive the overhead vapor and to produce a condensate, and a cook water system receiving the condensate, the system comprising:
a direct contact device configured to place at least a first portion of the overhead vapor received from upstream of the non-contact condenser into direct heat exchange contact with cook water of the cook water system; and
a fluid loop circulating the cook water from the cook water system, through the direct contact device, then back to the cook water system as a warm cook water mixture.

2. The system of claim 1, wherein the direct contact device comprises a direct contact condenser.

3. The system of claim 1, wherein the direct contact device comprises a first direct contact condenser, the system further comprising:
a thermocompressor comprising a suction side for receiving at least a second portion of the overhead vapor from upstream of the non-contact condenser and a motive side for receiving a plant process vapor, the thermocompressor operable to produce a vapor mixture; and
a second direct contact condenser comprising a vapor inlet interconnected with the thermocompressor to receive the vapor mixture, a working fluid inlet connected to receive the warm cook water mixture, and a working fluid outlet for directing a warmer cook water mixture back to the cook water system.

4. The system of claim 3, wherein the plant process vapor comprises boiler steam.

5. A corn ethanol plant comprising the system of claim 1.

6. A system for a grain alcohol plant, the system comprising:
a non-contact condenser for transferring heat to the environment from a last effect vapor produced by an evaporator;
a means for placing the last effect vapor into direct physical contact with a working fluid upstream of the non-contact condenser to at least partially condense the last effect vapor and to produce a heated working fluid; and
a means for using the heated working fluid in a process of the grain alcohol plant,
wherein the means for placing the last effect vapor into direct physical contact with a working fluid comprises one of a group consisting of a direct contact condenser and a thermocompressor.

7. The system of claim 6, wherein the means for using the heated working fluid comprises a cook water fluid loop interconnecting the direct contact condenser with a cook water system of the grain alcohol plant.

8. A corn ethanol plant comprising the system of claim 6.

9. The system of claim 6, wherein the means for placing the last effect vapor into direct physical contact with a working fluid comprises the direct contact condenser.

10. The system of claim 6, wherein the means for placing the last effect vapor into direct physical contact with a working fluid comprises the thermocompressor.

11. A method of energy management in a grain alcohol plant, the plant including an evaporator operative to remove moisture from thin stillage and a cook water system operative to provide cook water, the method comprising:
transferring heat from an overhead vapor produced by the evaporator to the cook water by:
directing at least a first portion of the overhead vapor to a vapor inlet of a direct contact heat exchanger; and
directing the cook water to a cook water inlet of the direct contact heat exchanger to produce warmed cook water,
wherein the direct contact heat exchanger comprises a first direct contact heat exchanger, and further comprising:
directing a second portion of the overhead vapor to a suction side of a thermocompressor and directing a plant process vapor to a motive side of the thermocompressor to produce a vapor mixture; and
directing the vapor mixture to a vapor inlet of a second direct contact heat exchanger and directing the warmed cook water to a cook water inlet of the second direct contact heat exchanger to produce a warmer cook water.

12. The method of claim 11, wherein the plant process vapor comprises boiler steam.

* * * * *